United States Patent [19]

Ito

[11] 4,251,242
[45] Feb. 17, 1981

[54] MIST ELIMINATOR
[75] Inventor: Kazuhiko Ito, Handa, Japan
[73] Assignee: NGK Insulators, Ltd., Japan
[21] Appl. No.: 11,764
[22] Filed: Feb. 12, 1979

Related U.S. Application Data

[63] Continuation of Ser. No. 821,958, Aug. 4, 1977, abandoned.

[51] Int. Cl.³ .................. B01D 45/16; B01D 45/18
[52] U.S. Cl. .................................... 55/242; 55/440
[58] Field of Search ............... 55/242, 257 PV, 440, 55/442–446

[56] References Cited
U.S. PATENT DOCUMENTS

| | | | |
|---|---|---|---|
| 1,554,185 | 9/1925 | Preble | 55/242 |
| 2,090,287 | 8/1937 | Cornelius | 55/440 X |
| 3,338,035 | 8/1967 | Dinkelacker | 55/440 |
| 3,771,430 | 11/1973 | Lane | 55/440 X |
| 3,849,095 | 11/1974 | Regehr | 55/440 X |
| 3,925,040 | 12/1975 | Fattinger | 55/440 X |
| 3,953,183 | 4/1976 | Regehr | 55/440 |

FOREIGN PATENT DOCUMENTS 828547 12/1969 Canada ........................... 55/440

Primary Examiner—Kathleen J. Prunner
Attorney, Agent, or Firm—Stevens, Davis, Miller & Mosher

[57] ABSTRACT

A mist eliminator comprises a plurality of blades spaced apart in parallel with each other. Each blade has a step-like portion which curves smoothly up to a single plateau. An elimination chamber is located on the plateau. The length from the eliminating chambers to gas outlets is less than that from gas inlets to the eliminating chambers and the parts of the blades from the eliminating chambers to the gas outlets is substantially parallel with a direction in which a gas enters the eliminator. The eliminator is provided at least in the rear of the blades with washing water nozzles for spraying washing water against the gas outlets. The eliminator is capable of effectively collecting fine mist and removing solid particles adhered to the blades by washing water with ease and therefore has no risk of clogging of gas passages.

3 Claims, 4 Drawing Figures

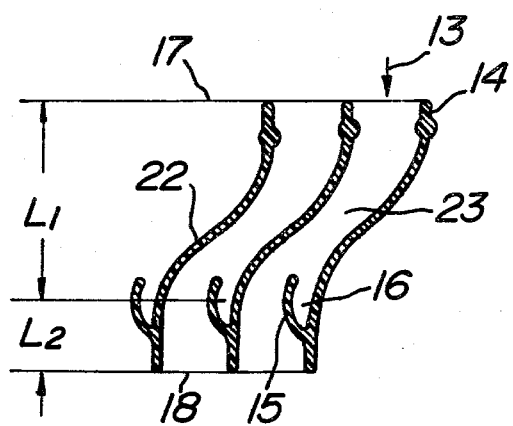
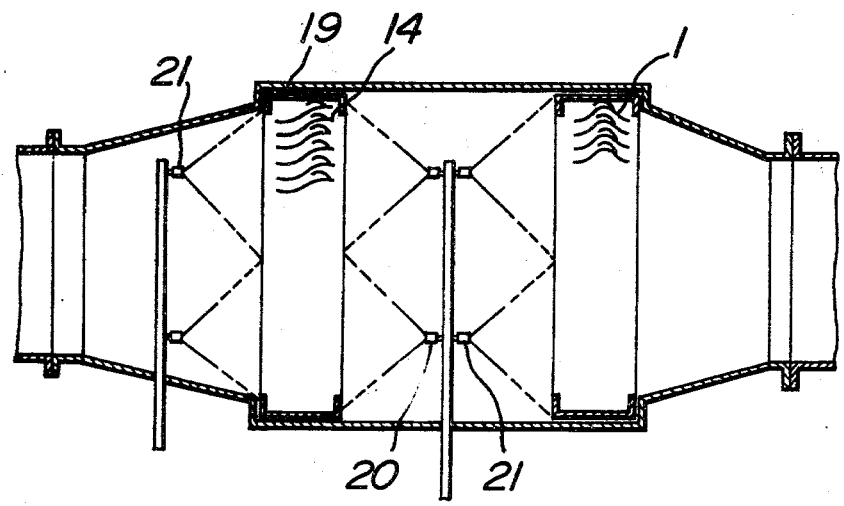

MIST ELIMINATOR

This is a continuation of application Ser. No. 821,958 filed Aug. 4, 1977, now abandoned.

BACKGROUND OF THE INVENTION

(1) Field of the Invention

The present invention relates to a mist separator or eliminator having a number of blades arranged in gas passages for collecting and separating fine mist in gas flow.

The expression "front" or "rear" used herein means an upstream side or downstream side of a gas flow with respect to the blades.

(2) Description of the Prior Art

There have been proposed various kinds of mist eliminators, one of which consists of a plurality of curved undulate blades arranged spaced apart a determined distance and provided at their crests and therebehind with baffle plates opening toward gas inlets to form separating or eliminating chambers. With this arrangement, gas passages are often clogged with solid particles adhered and accumulated at the proximities of bent portions of the blades and in front and the rear of the eliminating chambers when these particles are in the gas itself or in the moisture droplets which comprise the mist.

To solve this problem, washing water nozzles have been arranged in front of and to the rear of the undulate blades of the mist eliminator for continuously or intermittently spraying washing water against the blades to remove the accumulated solid particles. However, the impingement of water removes only the solid particles adhered and accumulated at the proximities of the inlets and outlets of the undulate blades, so that the washing water nozzles do not completely solve the problem of the clogging of the gas passages.

SUMMARY OF THE INVENTION

A primary object of the invention is, therefore, to provide an improved mist eliminator capable of effectively collecting fine mist and removing solid particles adhered to the blades by water cleaning with ease and therefore having no risk of clogging of gas passages thereof.

The mist eliminator according to the invention includes a plurality of blades arranged spaced apart in parallel with each other, each blade having a step-like portion which curves smoothly up to a single plateau and an eliminating chamber located on the plateau, the length of each blade from said eliminating chambers to the outlet defining edges of the blades is less than that from the inlet defining edges to the eliminating chambers, the parts of said blades from the eliminating chambers to the outlet defining edges being substantially parallel with a direction in which a gas enters the eliminator, and washing water nozzles at least in the rear of said blades for spraying washing water against the gas outlets.

BRIEF DESCRIPTION OF THE DRAWINGS

This and other objects, features and advantages of the invention will become more apparent upon a reading of the following detailed specification and drawings, in which:

FIG. 3 is an explanatory sectional view of one embodiment of the blades of the mist eliminator according to the invention; and FIG. 4 is an explanatory sectional view of the embodiment of the mist eliminator provided with the blades shown in FIG. 3.

DESCRIPTION OF THE PREFERRED EMBODIMENTS

Figure 1:
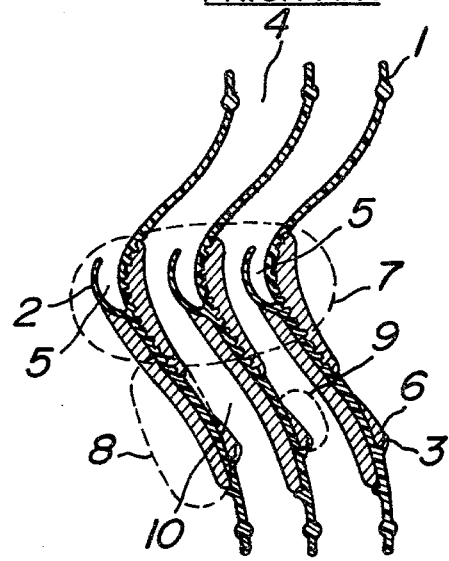
FIG. 1 is an explanatory sectional view of undulate blades of a mist eliminator of the prior art.

Referring first to FIG. 1 illustrating an exemplary mist eliminator generally used of the prior art, a plurality of streamlined undulate plates or blades 1 are arranged spaced apart a determined distance and provided at their crests and therebehind with baffle plates 2 and 3 opening toward gas inlets 4 to form separating or eliminating chambers 5 and 6.

With the mist eliminator such as shown in FIG. 1, gas passages 10 are often clogged with solid particles adhered and accumulated at the proximities of bent portions 7 of the blades 1, back areas 8 of the eliminating chambers 5 and front areas 9 of the eliminating chambers 6 when these particles are in the gas flow itself or in the moisture droplets which comprise the mist.

Figure 2:
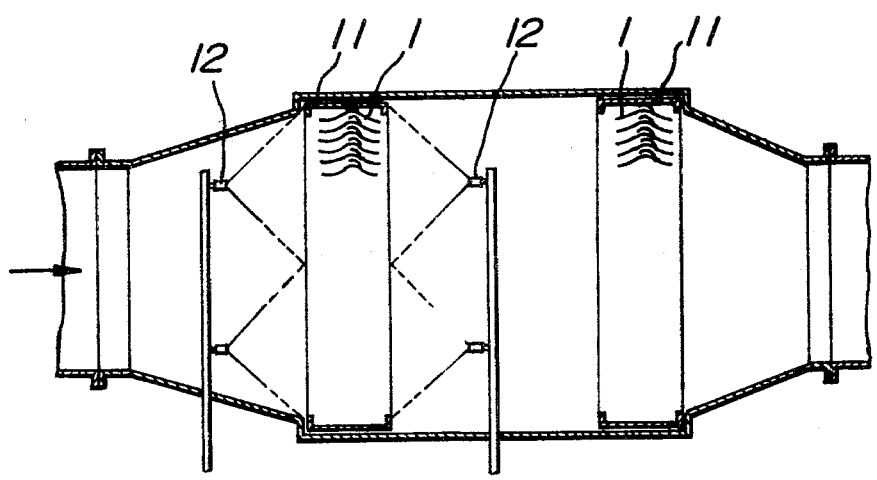
FIG. 2 is an explanatory sectional view of a mist eliminator provided with washing water nozzles and undulate blades of the prior art.

To solve this problem, as shown in FIG. 2, washing water nozzles 12 are arranged in front and the rear of the mist eliminator comprising the undulate blades 1 for continuously or intermittently spraying washing or cleaning water against the blades to remove the accumulated solid particles. However, the impingement of water removes only the solid particles adhered and accumulated at the proximities of the inlets and outlets of the undulate blades 1, so that it does not completely solve the problem of the clogging of the gas passages 10. Accordingly, these eliminators of the prior art have the impermissible disadvantage of the clogging of gas passages.

Referring to FIGS. 3 and 4 illustrating one embodiment of the invention, blades 14 are provided with step-like portions which curve smoothly up to single plateaus and with baffle plates 15 located on the plateau to form eliminating chambers 16. A length $L_2$ from the eliminating chambers 16 on the plateaus of the blades to gas outlets 18 is less than a length $L_1$ from gas inlets 17 to the eliminating chambers 16 on the plateaus of the blades and the plateaus or parts of the blades 14 from the eliminating chambers 16 to the gas outlets 18 extend substantially parallel with the direction in which the gas enters the eliminator as shown in an arrow 13. A plurality of thus formed blades 14 are arranged in parallel with and spaced apart to each other a determined distance. As shown in FIG. 4, washing water nozzles 20 and 21 are arranged at least in the rear of or preferably in front and the rear of the mist eliminator 19 comprising step-like blades 14. There may be of course provided with separate eliminating chambers (not shown) in rear of the eliminating chambers 16 of the blades 14 corresponding to the chambers 6 in FIG. 1, if desired.

As above described, the mist eliminator according to the invention is characterized in the fact that the length $L_2$ from the gas outlet 18 to the eliminating chambers 16 on the plateaus is less than the length $L_1$ from the eliminating chambers 16 on the plateaus to the gas inlets 17. Particularly, the ratio of the length $L_1/L_2$ is the most preferably within 5/1 to 2/1.

In this manner, the length $L_2$ is considerably shorter than the length $L_1$ from the gas inlets 17 to the eliminating chambers 16 of the blades, and the parts of the blades corresponding to the length $L_2$ extend substantially parallel to the direction 13 in which the gas enters the eliminator, thereby preventing the solid particles from accumulating at the proximities of the curved portions 22 of the blades 14 and facilitating to remove accumulated solid particles by means of the washing water from the cleaning nozzles 20 and 21 with ease, if they adhered or accumulated thereat. The nozzle 21 may be omitted. Accordingly, the mist eliminator according to the invention can substantially completely eliminate or reduce the clogging of the gas passages 23 to a very slight extent, and therefore can be continuously used for a long period of time even if the gas flow itself or the droplets comprising the mist include great amounts of solid particles. The mist eliminator according to the invention is very advantageous from the standpoint of the prevention of air pollution.

It is further understood by those skilled in the art that the foregoing description is a preferred embodiment of the disclosed eliminator and that various changes and modifications may be made in the invention without departing from the spirit and scope thereof.

What is claimed is:

1. A mist eliminator comprising, a plurality of blades, said blades being spaced apart in parallel to one another to define passages for the flow of mist therebetween, and to define an inlet and outlet for each passage, each of said blades being step-like and having a single step-like portion between the respective inlet-defining and outlet-defining edges of each of said blades, said step-like portion curving smoothly up to a single plateau of each of said blades, said plateau defining the outlet-defining edge of its respective blade and extending in a direction substantially parallel to the direction in which mist enters the eliminator; and an elimination chamber located on each said plateau so that the distance between each said elimination chamber and the outlet-defining edge of its respective blade is less than the distance from said elimination chamber to the inlet-defining edge of that blade; and wash nozzles located adjacent to said blades to spray washing water against that portion of each of said blades which is near the outlet-defining edge of each of said blades.

2. A mist eliminator as set forth in claim 1, wherein the ratio of the distance from the inlet-defining edge of any of said blades to the said elimination chamber of that same said blade and the distance from the oultet-defining edge to the said elimination chamber of that same blade is within 5/1 to 2/1.

3. A mist eliminator as set forth in claim 1, wherein second wash nozzles are arranged adjacent to said blades to spray washing water against that portion of each of said blades which is near the inlet-defining edge of each of said blades.

* * * * *